July 2, 1935. J. H. HAMMON 2,006,638
MULTIFOCAL OPHTHALMIC LENS AND BLANK THEREFOR
Original Filed March 27, 1934    2 Sheets-Sheet 1

INVENTOR.
James H. Hammon.
BY
Corbett + Mahoney
ATTORNEYS.

July 2, 1935.  J. H. HAMMON  2,006,638
MULTIFOCAL OPHTHALMIC LENS AND BLANK THEREFOR
Original Filed March 27, 1934   2 Sheets-Sheet 2

INVENTOR.
James H. Hammon.
BY
ATTORNEYS.

Patented July 2, 1935

2,006,638

UNITED STATES PATENT OFFICE 2,006,638

MULTIFOCAL OPHTHALMIC LENS AND BLANK THEREFOR

James H. Hammon, Vincennes, Ind.

Original application March 27, 1934, Serial No. 717,632. Divided and this application April 26, 1935, Serial No. 18,445

6 Claims. (Cl. 88—54)

My invention relates to multifocal ophthalmic lenses and blanks therefor. It has to do particularly with the provision of a novel type of lens and lens blank which permits of the production of trifocal and other multifocal lenses more completely adequate to the correction of defective vision.

In the making of multifocal ophthalmic lenses and, particularly in the making of trifocal lenses, there are several factors of importance which should be taken into consideration. Chief among these factors are the prismatic effects of the various portions of the lenses and the shapes of such portions both individually and in relation to each other.

With respect to the prismatic effects of the various portions of multifocal ophthalmic lenses, there are several aspects which are particularly important. For one thing, hitherto little consideration has been given to the question of the proper location of the optical centers of reading portions and intermediate vision portions of multifocal ophthalmic lenses and little has been done to insure the attainment of such proper location.

Many prior art multifocal lenses apparently overlook the fact that the relative position of the eyes in reading is markedly different from their position in distance vision and that a somewhat similar difference exists between the position of the eyes in intermediate vision in comparison with their position in distance vision or in reading. It is customary in fitting multifocal lenses to place the optical centers of the distance portion directly in front of the pupils when the patient is viewing a distant object. When the patient looks at a closer object the eyes converge and the distance between the pupils is lessened so that he no longer sees through the same portion of the lens. Unless provision is made to offset the effect the patient will be viewing the near object through prismatic portions of the lenses. Little or no attempt has been made to provide reading segments whose prism bases are properly located to compensate for the prismatic effect of the main lens and, in cooperation therewith, to produce a net correction that will be fully effective.

With respect to the question of the shapes of the various portions of multifocal lenses, most prior art trifocal lenses have been so made that they automatically present difficulties to the provision of the proper shapes of the reading segment portion, the intermediate vision segment portion and the distance portion of the lenses, this being particularly true in fused trifocal lenses. Consequently, little success has been had in the marketing of such trifocal lenses. Partly because of manufacturing difficulties and partly because of lack of perception, the art has more or less turned its back upon certain shapes of reading portions and intermediate vision portions which are particularly suitable for the average user of trifocal lenses.

One of the objects of this invention is to provide a fused multifocal ophthalmic lens wherein a reading segment of prismatic form and of prescribed prismatic effect may have its base disposed according to prescription in order that proper correction may be effected both by the amount of prism introduced and by the proper location of the base of the prism constituting such reading portion. It is also an object of this invention to provide for similar correction in the intermediate vision portion. In other words, one object of my invention is to provide for the incorporation in an ophthalmic lens of a fused prism segment of proper prismatic strength and with the optical center thereof at any point with relation to the optical center of the distance vision portion, depending upon the correction required by the particular eye being fitted.

Another object of this invention is to provide a fused trifocal ophthalmic lens with a distance vision portion, a reading segment portion and an intermediate vision portion, all of which are so shaped and located with relation to each other as to insure a maximum utility in the performance of the functions for which they are particularly designed.

Various other objects of this invention will appear as this description progresses.

In making a trifocal lens in accordance with my invention, I provide a main lens blank of suitable form and of substantially uniform thickness. I also form in one side thereof a substantially spherical countersink. I then provide a composite button for fusing in the spherical countersink. This composite button is prepared preferably by preparing a segment from glass of an index of refraction different from the main lens and suitable for the reading segment, surrounding or partially surrounding this reading segment with an intermediate segment of glass of an index of refraction different from both the reading segment and the main lens blank, and then surrounding the intermediate segment with a carrier portion of glass of the same index of refraction as the main lens blank. The intermediate and reading segment are both of substantial thickness throughout. When this composite button is fused to the main lens blank, the carrier portion of the composite button will fuse with the glass of the main lens blank which is of the same index of refraction and will become an indistinguishable part thereof. In the lens blank produced, there will be a reading segment which has substantial thickness all along its edge and an intermediate segment which also has substantial thickness all along its edge. The lens blank thus produced may then be ground in such a manner that the optical center of either minor segment may be selectively located as desired. Because of the fact that both segments have substantial thickness all along their edges, prismatic power may be produced in either segment with the base of the prism selectively located.

This application is a division of my co-pending application Serial No. 717,632, filed March 27, 1934, which is, in turn, a division of my co-pending application Serial No. 673,708, filed May 31, 1933. Said application Serial No. 673,708 is a continuation in part of my applications, Serial No. 503,627, filed Dec. 30, 1930, Serial No. 505,807, filed December 31, 1930, and Serial No. 619,365, filed June 27, 1932, the latter being a continuation in part of Serial No. 503,127, filed Dec. 18, 1930.

The preferred embodiments of my invention are shown in the accompanying drawings wherein similar characters of reference designate corresponding parts and wherein.

Figure 8:
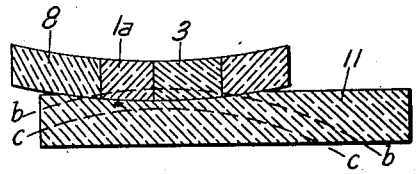
Figure 8 is a sectional view illustrating the composite blank of Figure 6 mounted in the spherical countersink in the blank of Figure 7.
Figure 9:
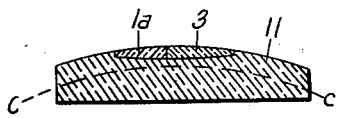
Figure 9 is a sectional view of a semi-finished blank formed from the structure shown in Figure 8.
Figure 10:
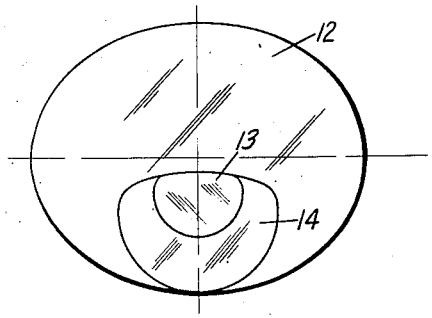
Figure 10 is a plan view of a trifocal lens of a type which may be produced according to my invention and wherein the intermediate vision portion embraces the reading segment and extends for substantial distances on both sides thereof while the upper edges of both portions form part of a continuous line.
Figure 11:
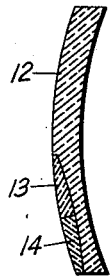
Figure 11 is a vertical transverse section taken through the lens of Figure 10 and illustrating that both the reading segment and the intermediate vision segment have substantial depth at all points throughout their areas.

With reference to the drawings, and particularly to Figures 1 to 11 inclusive, I have illustrated how a trifocal lens may be made in accordance with the principles of my invention. The finished lens is illustrated in Figures 10 and 11.

It will be noted from Figure 10 that in the finished lens, the intermediate vision segment is so shaped with relation to the reading segment that the intermediate vision portion provides a substantial area for intermediate vision on both sides of the reading portion and extending upwardly substantially to the top line of such reading portion. It will further be noted that the tops of both the reading portion and the intermediate vision portion take the form of low flat arches which are joined to the sides of such portions by small arcs. This is rendered possible by a blank structure which is now to be described and which also makes possible complete control of the optical center of the intermediate vision portion in addition to the control of the location of the optical center of the reading segment portion.

Figure 1:
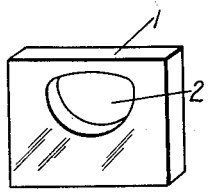
Figure 1 is an enlarged perspective view of a carrier button for a reading segment button, the carrier button being of such a nature that it may serve as the intermediate segment of the finished lens.
Figure 2:
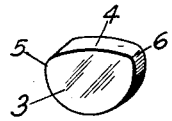
Figure 2 is an enlarged perspective view of the reading segment button which is adapted to be disposed in the opening in the button of Figure 1.
Figure 3:
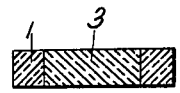
Figure 3 is an enlarged sectional view of a composite button which comprises the reading segment button and the carrier button both of which are made of glass of a different index of refraction from the main lens blank to which the composite button is subsequently fused and each of which is a different index of refraction from the other.
Figure 4:
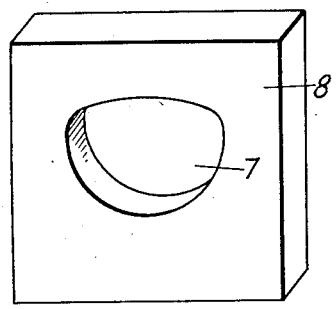
Figure 4 is an enlarged perspective view of a carrier button which is perforated for the reception of a composite button made from that of Figure 3, the carrier button being of the same index of refraction as the main lens blank to which it is subsequently fused.

In making the lens blank in accordance with my invention, I utilize a segment of glass 1 (Figure 1) suitable for forming the intermediate segment of the finished lens. This segment 1 is provided with an aperture 2 for receiving a reading segment button 3 (Figure 2). The aperture 2 extends entirely through the segment 1 and under preferred conditions may be produced by punching while the glass is hot and of a viscosity which will render this feasible. This method is more economical than cutting or grinding the aperture, though cutting or grinding may be resorted to if desired. Also, I may form a hole or socket in the segment 1 which does not extend entirely through this segment and which is of a form to receive the reading segment button. This may also be accomplished by the punching of the glass segment 1 while hot and, of course, the punch and the hole formed thereby may be of any desired contour. This segment 1 is of a different index of refraction from the reading segment button 3 to be disposed in the aperture formed therein and is also of a different index of refraction from the major blank portion to be subsequently described.

Figure 5:
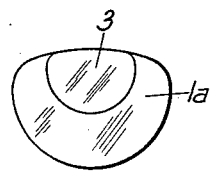
Figure 5 is an enlarged plan view of the composite button which has been formed from the button of Figure 3 and which is to be introduced into the perforation in the carrier button shown in Figure 4.

The reading segment 3 is shown in Figure 2 as resembling in area the lower half of a circle with a low flat-arched top 4 joined to the lower sides of the segment by short arcs 5 and 6. This reading segment button 3 is disposed within the aperture 2 of the segment 1 and is preferably fused therein. After it has been so positioned in the member 1, a composite button is formed from these members by cutting or grinding and one shape of this composite button is illustrated in Figure 5 of the drawings wherein the reading segment portion is designated 3 and the intermediate vision segment portion is designated 1a.

This composite button is thereupon fitted and fused into an aperture 7 which is formed in a blank 8 in the same manner in which the aperture 2 in segment 1 is formed. This blank 8 is of a different index of refraction from the intermediate and reading segment portions but is of an index of refraction identical with the index of refraction of the major lens blank to be described.

Figure 6:
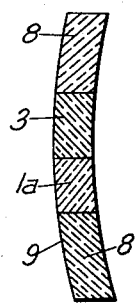
Figure 6 is an enlarged vertical sectional view of the composite button embodying the carrier button of Figure 4 and the composite button of Figure 5, with one surface thereof made convex to approximate a spherical countersink to be provided in the main lens blank for the reception thereof.
Figure 7:
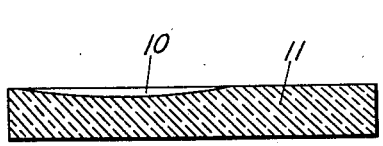
Figure 7 is a sectional view of a main lens blank, taken through the spherical countersink which is provided therein.

The blank thus formed is illustrated in Figure 6 in the condition assumed after its lower surface has been ground to a convex curvature 9 so that it will fit into a spherical countersink 10 of a major lens blank 11 (Figure 7). It is also shown ground with its opposite side concave which is advisable in certain cases of fusing. This major lens blank 11 is formed of glass of a different index of refraction from the intermediate and reading segment portions but of the same index of refraction as the carrier portion 8. This blank is preferably of substantial and uniform thickness throughout. The countersink 10 is of larger diameter and, consequently, of greater depth than has been provided customarily in the prior art. Furthermore, it is of a selected and known curvature and is preferably positioned in a selected relation to the geometrical center of the lens blank.

The composite blank is positioned in the countersink as illustrated in Figure 8 and is fused therein to form the semi-finished lens blank illustrated in this figure. During the fusion of the composite blank to the major lens blank, the lower surface of the entire composite blank takes the curve of the countersink 10 and the carrier portion 8 merges with the major lens blank 11 so that the line of demarcation therebetween disappears. The upper surface of the semi-finished blank may then be ground to convex form, for example, to the curvature indicated by the dotted line b—b. Its under surface may then be ground to concave form, for example, to the curvature indicated by line c—c. The depth of the spherical countersink 10 is such and the selected curvature b—b may be such that both the reading segment button and the intermediate vision segment button retain their areas unchanged and have substantial thickness all along their edges although the grinding may be continued to produce feather edges if desired.

A semi-finished lens blank is illustrated in Figure 9. This lens blank may further be ground on the one side as along the line c—c. It will be undertood that the lens blank may be supplied in this semi-finished condition by the manufacturer and that subsequently it may be ground to the proper curvature which is so selected, relative to the curvature on the other side of the lens blank, as to give the proper correction.

The finished trifocal lens is made by cutting from the finished lens blank of Figure 9. This finished lens embodies a distance portion 12 (Figure 10), a reading portion 13 and an intermediate portion 14. The intermediate portion 14 embraces the reading portion and lies below and on both sides of the reading portion. The upper boundary line of the reading portion is substantially coincident with the upper boundary line of the intermediate portion. As shown in Figure 11, both the intermediate and the reading segments have substantial thickness all along their edges. Thus, there is a dividing wall between all the various portions of the lens of substantial depth and which is substantially perpendicular to the surface of the lens. However, as stated above, the grinding operations may be continued sufficiently to produce feather edges if desired along certain portions of the divisional walls.

It will be seen from the above that I have provided a composite structure whose disassembled parts are of such a nature and so related to each other that I am able to produce a multifocal lens wherein the minor lens portions are prismatic and wherein the base of at least one of these prisms may be located in any direction with relation to the center of the finished major lens portion. More specifically, by locating the minor lens segments within a carrier button which fits in a spherical countersink in the major lens blank, I may so position the minor lens segments in such spherical countersink that the optical center of at least one of such minor segments will be at any selected point either within or outside of such segment.

In the blank construction illustrated in Figures 1 to 8 inclusive, many advantages accrue from the fact that the combined intermediate and reading segments are carried by a carrier portion of the same index of refraction as the main lens blank. One of these advantages arises from the fact that the outer periphery of this intermediate vision segment is independent of the outer periphery of the spherical countersink. In other words, the carrier portion provides glass of the same index of refraction as the main lens blank to fill in around the sides of the composite button within the countersink. This provides submerged side walls for the intermediate and reading portions which permits these portions to be further ground prismatically after fusion. Also the carrier button may be provided with an aperture of any shape to receive the composite reading and intermediate vision segment buttons.

Figure 12:
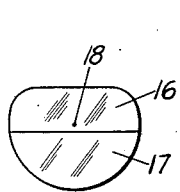
Figure 12 is a plan view of a modified form of composite button which I may use in making a trifocal lens according to my invention.
Figure 13:
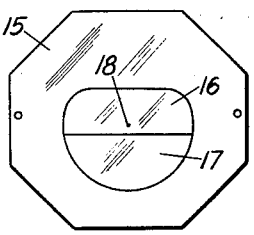
Figure 13 is a plan view of a trifocal lens having an intermediate vision portion and a reading portion made by the use of the composite button illustrated in Figure 12.
Figure 14:
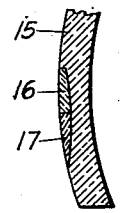
Figure 14 is a sectional view taken through a portion of the lens of Figure 13 so as to show a cross section of the intermediate vision segment and the reading segment.

In Figures 12, 13 and 14, I have illustrated a modified form of trifocal lens which may be made in accordance with my invention and which possesses numerous advantages. This lens may be made in much the same manner in which the lens of Figures 10 and 11 is made. It embodies a distance vision portion 15, an intermediate vision portion 16 and a reading portion 17. A button embodying the intermediate and reading segments is illustrated in Figure 12 and it will be readily understood that in making this lens, this button is surrounded with a carrier portion of the same index of refraction as the main lens blank and which when fused to the lens blank will become an indistinguishable part thereof. Consequently, as in the other structure, the blank produced will have an intermediate and reading segment embedded therein for a substantial depth throughout their entire areas, though further grinding may be resorted to to produce feather edges.

In this lens, the distance field 15 occupies the major portion thereof, being located above the intermediate and reading segments and also extending around the sides and bottom thereof. Thus, an object at a distance may be readily observed through the upper portion of the lens and through the sides thereof while objects on the floor or ground may be readily observed through the lower portion of the distance field.

The intermediate vision portion 16 and the reading portion 17 are preferably so formed that the optical center is located as at 18. In this position, it is near the dividing line between these two segments, so that the eye in passing across this dividing line is not annoyed by any apparent jumping of the image. On the other hand, this optical center is, due to the relatively flat upper edge of the intermediate portion, also located not far from the upper dividing line between the intermediate vision portion and the distance portion of the lens. This also precludes any material jump of the image as the eye passes across this upper dividing line.

Another advantageous feature of this type of trifocal lens arises from the fact that the intermediate field of vision permits a broad lateral range of vision so that the wearer may readily observe a comparatively broad expanse of desk, workbench or other surface. At the same time, the reading segment has an upper edge which is amply wide to permit adequate vision immediately below such upper edge laterally in all movements of the eye normally used in reading.

The structure of the blank from which this lens is made permits of the incorporation of additional prism powers in the reading and intermediate vision segments. Likewise, the bases of these prisms may be located in any prescribed relation to the geometrical center of the lens. As shown in Figure 14, when this lens is finished from the lens blank, it is ground in such a manner that the shoulder or thick edge at the extreme lower end of the reading segment 17 is substantially eliminated and a feather edge is formed and, consequently, the base of the prism in the reading segment will be disposed adjacent the top edge thereof. However, the lens blank may be ground differently to locate the base of the prism selectively.

Figure 15:
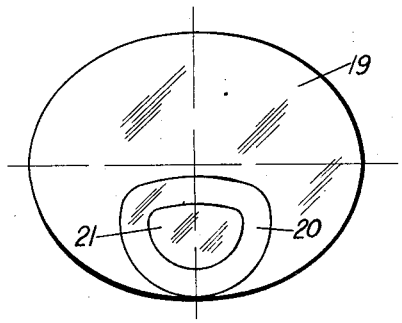
Figure 15 is a plan view of a modified form of trifocal lens which may be made according to my invention and which has different shaped reading and intermediate segments.

In Figure 15, I show a modified type of trifocal lens which may be made in accordance with my invention. This lens is also made by use of a carrier portion of the same index of refraction as the main blank which carries the combined reading and intermediate segments. Consequently, both the reading and intermediate segments will be embedded in the lens blank for a substantial depth throughout their areas. In this figure the finished lens is shown as comprising a distance portion 19, an intermediate portion 20 and a reading portion 21. The intermediate and reading portions are located in the lower portion of the distance portion and the intermediate portion entirely surrounds the reading portion. Both the reading portion and the intermediate portion have a substantially semicircular lower edge joined to a substantially flat upper edge by two short arcs, as shown.

Because it is possible to provide a carrier button or portion with an aperture therein of any selected shape for the reception of the composite reading and intermediate vision segment button, these segment buttons may be made of shapes not hitherto attainable economically in fused trifocal lenses. For example, an intermediate vision segment of the shape shown in Figure 13 has not hitherto been attainable in the types of unfinished lens blanks found in the prior art. This has been due particularly to the necessity for having the glass surrounding the reading segment button of circular form at the outer periphery of the spherical countersink. This factor has also placed a limitation upon the variation in shape of the reading segment button. But with my described blank structure, practically any shape of reading segment and intermediate vision segment is attainable in a trifocal lens blank and lens in a practicable and economical way.

Another advantageous feature of my invention arises from the fact that the lower portion of one of the segment buttons approximates a half circle. One result of this is that the operator, in performing the grinding operation, need only observe the bounding wall from time to time to be sure that its depth is being progressively diminished to an equal extent all around in such cases where the optical center of the said segment is located an equal distance from all points of the boundary wall.

A still further advantage of my lens construction is that it embodies a reading segment, and in some cases an intermediate vision segment, having a wide visual area of substantial height along the upper edge thereof whose lateral bounding walls take the form of arcs which approximate the radius of the pupil and which join the semi-circular parts of the segments to the comparatively low arches or substantially flat lines that form the tops thereof. These low arches and the arcs which connect them to the semi-circular portion of the segments reduce undesirable reflections to a minimum. Likewise, sharp upper corners of the segments, rendered practically necessary by previous blank construction, which are inefficient as portions of fields of vision and which subtract from the areas of the distance fields are entirely dispensed with by the use of my blank construction and by the shape of segments indicated.

Another advantage of my invention consists in the fact that it makes possible the construction of a trifocal lens wherein an intermediate field of vision surrounds or substantially surrounds the reading segment and is concentric or eccentric with relation thereto. Furthermore, it is possible to construct a trifocal lens with the reading segment of any desired shape and with the intermediate segment of any desired shape.

Throughout this specification, I have used the terms "reading portion", "intermediate vision portion" and "distance vision portion" to indicate portions of different focal powers especially fitting them for their specific uses. It will be understood, however, that these various portions are not limited to those positions in the lens in which I have shown them. They are interchangeable as to location without departing from the spirit of my invention. Thus, the reading portion may surround or embrace or be above the intermediate vision portion, or vice-versa, as desired. Likewise, the major lenticular area which I have termed "the distance portion" may be the reading portion with the distance portion replacing the reading portion as to location.

Changes such as these are within the scope of my invention.

Various other advantages of my invention will appear from the appended claims.

Having thus described my invention, what I claim is:

1. An unfinished fused lens blank for multifocal lenses having more than two fields of vision which comprises a major blank portion of an index of refraction suitable for distance vision, and a composite piece of glass embodying a segment of a second index of refraction suitable for reading and a segment of a third index of refraction suitable for intermediate vision, said composite piece of glass having an optically prepared surface of continuous curvature embedded in said major blank portion to a substantial depth throughout its entire area.

2. A trifocal lens in which the major portion is formed of glass having an index of refraction suitable for distance vision, a segment for near vision fused in said lens and a segment for intermediate vision of still different index fused in said lens, having a common embedded surface, both of said segments having thick edges and being embedded a substantial depth in the major portion throughout their areas.

3. An unfinished lens blank for multifocal lenses having more than two fields of vision which comprises a major blank portion of one index of refraction, a reading segment portion of a second index of refraction, and an intermediate vision portion of a third index of refraction, said last two portions being fused together and being each embedded in a depression of uninterrupted curvature in said major blank portion to a substantial depth throughout its entire area.

4. A composite glass button to be embedded into a major blank portion of one index of refraction which comprises a segment of glass of a second index of refraction embracing a segment of glass of a third index of refraction and with both such segments of substantial thickness throughout and surrounded by glass of the same index of refraction as the major blank portion.

5. A finished lens blank comprising a major blank portion of one index of refraction, a reading segment portion of a second index of refraction and an intermediate vision segment portion of a third index of refraction, said last two portions having their edges fused together and being fused and embedded in said major blank portion to a substantial depth throughout their entire areas with inner lenticular surfaces of merging curvature.

6. A trifocal lens consisting of a major portion of glass of one index of refraction, an intermediate portion of glass of another index of refraction fused therewith, and a minor portion of glass having another index of refraction, and with a surrounding wall between said last two portions and the major portion which is substantially perpendicular to the surface of the lens, said minor portion of glass being embedded and fused in said intermediate portion and with its upper boundary line substantially coincident with the upper boundary line of the intermediate portion, substantially as shown.

JAMES H. HAMMON.